United States Patent [19]

Kuroda et al.

[11] Patent Number: 5,157,864
[45] Date of Patent: Oct. 27, 1992

[54] CRAB TRAP APPARATUS

[76] Inventors: Benony D. Kuroda, 14452 Stateline Rd.; Ted L. Rogers, P.O. Box 2697, both of Harbor, Oreg. 97415

[21] Appl. No.: 783,522
[22] Filed: Oct. 28, 1991
[51] Int. Cl.$^5$ ............................................. A01K 69/00
[52] U.S. Cl. ............................................. 43/100
[58] Field of Search ................... 43/100, 87, 42.7, 105

[56] References Cited

U.S. PATENT DOCUMENTS

| | | | |
|---|---|---|---|
| 2,656,642 | 10/1953 | Richa | 43/100 |
| 2,793,466 | 5/1957 | Esposito | 43/100 |
| 4,216,607 | 8/1980 | Lyster | 43/100 |
| 4,271,625 | 6/1981 | Archer | 43/100 |
| 4,697,381 | 10/1987 | Esgro | 43/100 |

Primary Examiner—Kurt C. Rowan
Attorney, Agent, or Firm—Leon Gilden

[57] ABSTRACT

A crab trap is formed with a torroidal ring mounting a plurality of snare loops at spaced intervals thereabout extending exteriorly of the ring, including bait securement structure medially thereof in the form of a bait mounting rod or alternatively of a bait basket.

4 Claims, 4 Drawing Sheets

CRAB TRAP APPARATUS

BACKGROUND OF THE INVENTION

1. Field of the Invention

The field of invention relates to crab trap apparatus, and more particularly pertains to a new and improved crab trap apparatus wherein the same is arranged for the snaring of crabs avoiding their damage during a fishing procedure.

2. Description of the Prior Art

Crab trap structure of various types is utilized throughout the prior art utilizing various forms of snaring and the like to permit their capture. Such apparatus is exemplified in the U.S. Pat. No. 4,654,997 to Ponzo wherein a basket is provided with hinged doors that are lifted to a closed configuration to trap crabs directed within the cage structure by bait.

U.S. Pat. No. 4,479,325 to Jackimas sets forth a collapsible crab trap utilizing netting in a cage-like structure to trap crabs therewithin.

U.S. Pat. No. 4,887,382 to Moritz sets forth a crab trap including closure doors to trap crabs therewithin.

As such, it may be appreciated that there continues to be a need for a new and improved crab trap apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of crab trap apparatus now present in the prior art, the present invention provides a crab trap apparatus wherein the same utilizes snare rings to capture a crab attracted to a medially positioned bait portion centrally of a plurality of such snare members. As such, the general purpose of the present invention, which will be described subsequently in greater detail, is to provide a new and improved crab trap apparatus which has all the advantages of the prior art crab trap apparatus and none of the disadvantages.

To attain this, the present invention provides a crab trap formed with a torroidal ring mounting a plurality of snare loops at spaced intervals thereabout extending exteriorly of the ring, including bait securement structure medially thereof in the form of a bait mounting rod or alternatively of a bait basket.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved crab trap apparatus which has all the advantages of the prior art crab trap apparatus and none of the disadvantages.

It is another object of the present invention to provide a new and improved crab trap apparatus which may be easily and efficiently manufactured and marketed.

It is a further object of the present invention to provide a new and improved crab trap apparatus which is of a durable and reliable construction.

An even further object of the present invention is to provide a new and improved crab trap apparatus which is susceptible of a low cost of manufacture with regard to both materials and labor, and which accordingly is then susceptible of low prices of sale to the consuming public, thereby making such crab trap apparatus economically available to the buying public.

Still yet another object of the present invention is to provide a new and improved crab trap apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
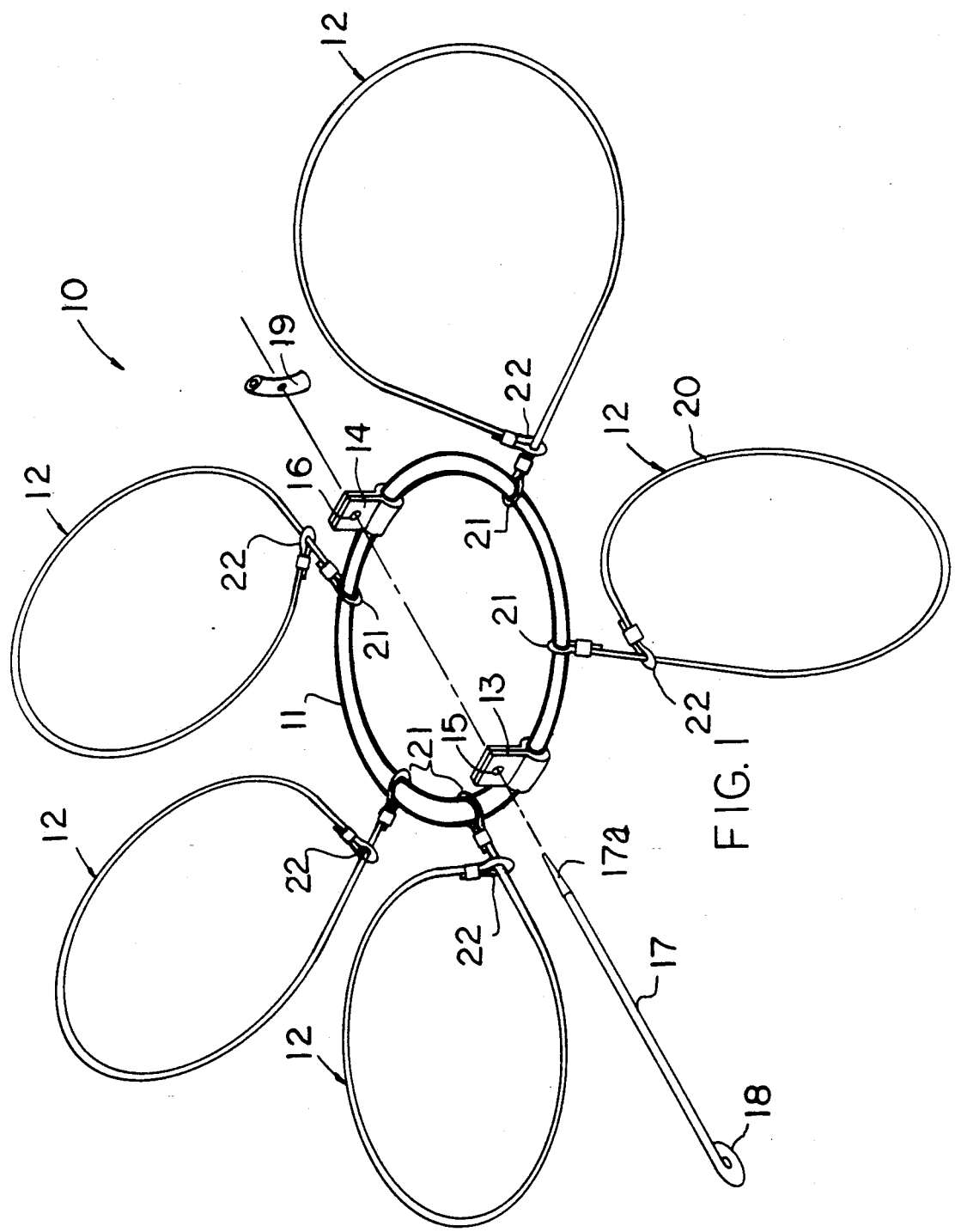
FIG. 1 is an isometric illustration of the instant invention.
Figure 2:
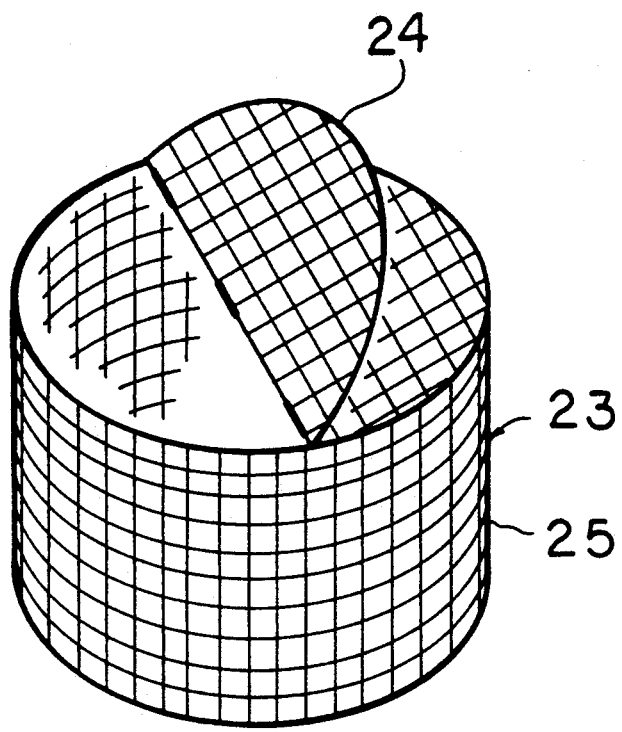
FIG. 2 is an isometric illustration of a bait cage utilized by the instant invention.
Figure 3:
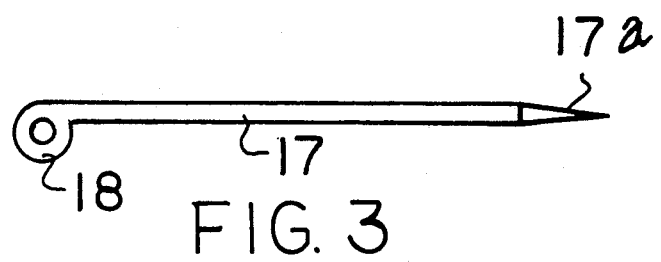
FIG. 3 is an orthographic side view of a bait securement rod utilized by the invention.
Figure 4:
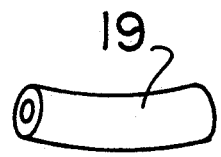
FIG. 4 is an isometric illustration of a fastener tube utilized by the invention.
Figure 5:
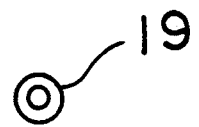
FIG. 5 is an orthographic end view of the fastener tube as set forth in FIG. 4.
Figure 6:
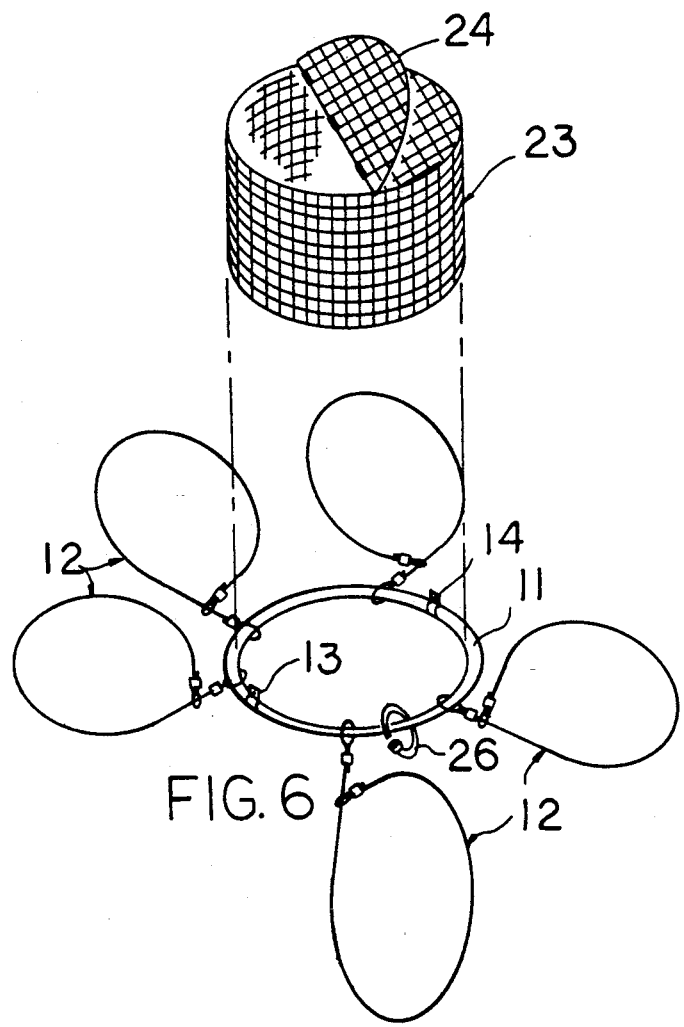
FIG. 6 is an isometric illustration of the invention utilizing the bait cage.
Figure 7:
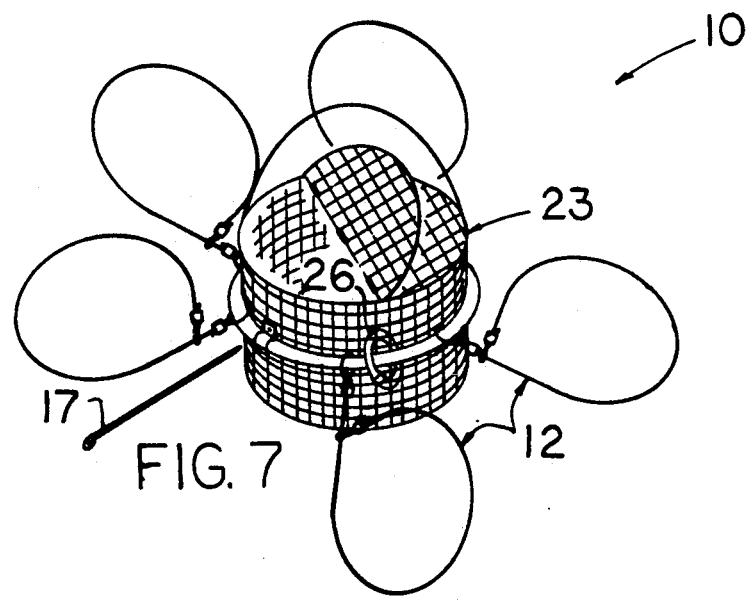
FIG. 7 is an isometric illustration of the invention in an assembled configuration.

With reference now to the drawings, and in particular to FIGS. 1 to 9 thereof, a new and improved crab trap apparatus embodying the principles and concepts of the present invention and generally designated by the reference numeral 10 will be described.

More specifically, the crab trap apparatus 10 of the instant invention essentially comprises a torroidal support ring 11 having slidably mounted thereon a plurality of spaced snare loops 12 thereabout. The snare loops 12 extend exteriorly of the support ring, with the support ring further including diametrically opposed first and second brackets 13 and 14 arranged in a parallel relationship extending upwardly of the support ring, with the first and second brackets 13 and 14 including respective first and second bracket bores 15 and 16 that are coaxially aligned relative to one another. A bait securement rod 17 is received through the coaxially aligned bores 15 and 16 to typically secure a portion of bait and further permit securement of a fishing line thereto. The bait securement rod includes an abutment 18 formed at a rear terminal end thereof, with a rod forward point end 17a directed through a forward end thereof and when directed through both brackets 13 and 14, a fastener member 19, such as a flexible tube of resilient construction receives the forward point end 17a to latch the rod 17 to the ring 11. It should be further noted that the support ring 11 is formed of a predetermined internal diameter mounting the loops 12 thereon.

In this vein, bait bucket 23 is provided defined by a cylindrical side wall defined by a predetermined external diameter to be frictionally received within the torroidal support ring 11. Further, at least one, if not a plurality, of clamp rings 26 are directed about the support ring 11 and through the mesh bait bucket 23. An entrance door 24 mounted through a top wall of the bait bucket is arranged to receive bait therethrough.

Each of the snare loops 12 is formed with a first slide loop 21 at a forward distal end of each snare loop mounted to a forward distal end of the associated flexible line 20 for sliding engagement about the torroidal support ring. A second slide loop 22 formed at a rear distal end of the flexible line 20 is slidably arranged to receive the flexible line 20 therethrough to provide for the loop structure, as illustrated, and is thereby slidably mounted between the forward and rear distal ends of the flexible line 20.

Figure 8:
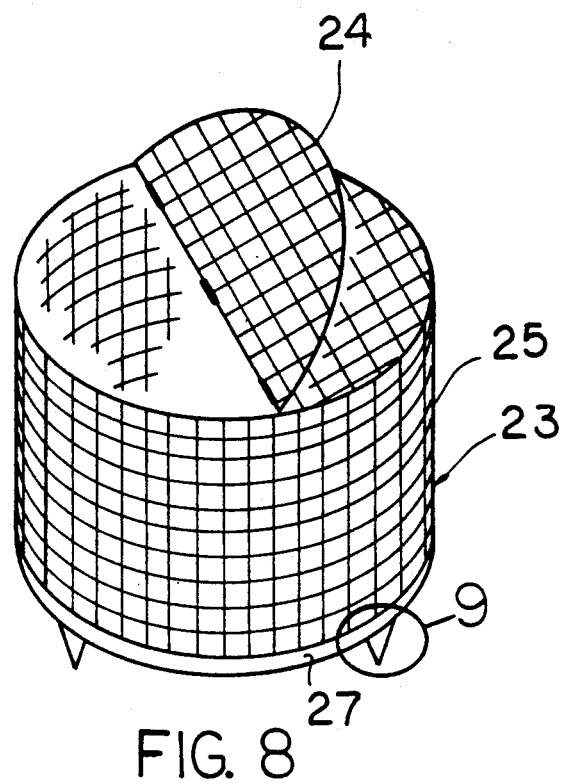
FIG. 8 is an isometric illustration of a modified bait cage structure.
Figure 9:
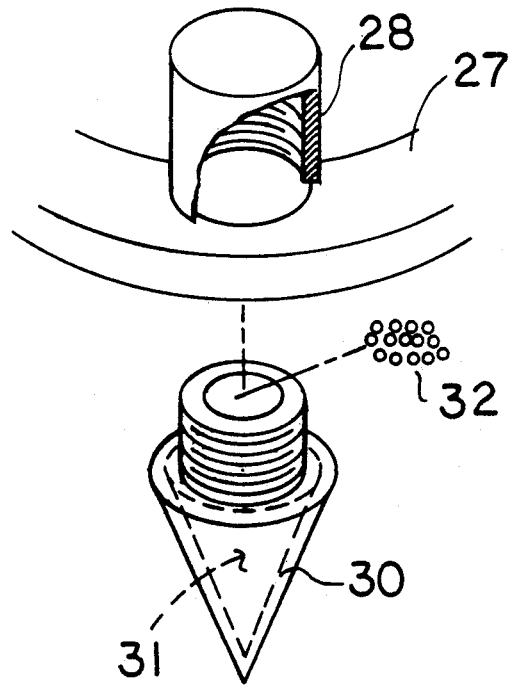
FIG. 9 is an enlarged isometric illustration of section 9 as set forth in FIG. 8.

FIGS. 8 and 9 illustrate a modified bait bucket 23a including a bait bucket base ring 27 including a plurality of internally threaded sockets 28 projecting downwardly relative to the base ring to receive inverted conical anchor pins 30 to enhance anchoring and positioning of the bait bucket and structure relative to various bottom surfaces of a body of water. The inverted hollow conical anchor pin 30 defines an anchor pin cavity 31 therewithin, and includes a tubular externally threaded boss 29 extending coaxially and upwardly relative to a base of the anchor pin, wherein the boss 29 is received within the internally threaded socket 28. Further, a plurality of metallic shot spheres 32 are provided to provide for enhanced ballast and weight for the structure to provide for proper alignment of the organization when directed downwardly into a body of water. The spherical shot is accordingly positioned within the anchor pin cavity 31 in a quantity as required to properly project the anchor pin within an underlying support surface or water bottom.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A crab trap apparatus, comprising,
   a torroidal support ring, the support ring defined by a predetermined internal diameter, and
   a plurality of snare loops slidably mounted on the support ring extending exteriorly thereof, and
   bait support means secured to the torroidal support ring for attracting at least one crab member thereto and for securement of a fishing line, and
   the bait support means includes a first bracket mounted fixedly to the torroidal support ring spaced from and parallel to a second bracket mounted to the torroidal support ring, wherein the first bracket and the second bracket are mounted diametrically opposed relative to one another and extending upwardly relative to the torroidal support ring, and the first bracket includes a first bracket bore, and the second bracket includes a second bracket bore, the first bracket bore and the second bracket bore are coaxially aligned, and the bait support means further includes a bait securement rod defined by a predetermined length greater than the predetermined internal diameter, wherein the bait securement rod includes a rod abutment fixedly mounted to a rear distal end of the bait securement rod, and the forward distal end of the bait securement rod defines a forward pointed end, and a fastener member directed through the forward point end exteriorly of the second bracket.

2. An apparatus as set forth in claim 1 wherein the bait support means further includes a mesh bait basket positioned within the torroidal support ring receiving the bait securement rod therethrough, the mesh bait basket defined by a predetermined external diameter equal to the predetermined internal diameter, and the bait basket further including an entrance door pivotally mounted through a top wall of the mesh bait basket, and at least one clamp ring directed through the mesh bait basket and the torroidal support ring for securement of the mesh bait basket to the torroidal support ring.

3. An apparatus as set forth in claim 2 wherein each snare loop of the snare loops includes a flexible line, a forward distal end of the flexible line includes a first slide loop, the first slide loop slidably receiving the torroidal support ring therethrough, and a rear distal end of the flexible line includes a second slide loop, the second slide loop receives the flexible line therethrough medially of the forward distal end and the rear distal end of the flexible line.

4. An apparatus as set forth in claim 3 wherein the mesh bait basket includes a bait basket base ring, the bait basket base ring positioned below the torroidal support ring, and the base ring including a plurality of internally threaded sockets directed downwardly relative to the base ring, and each of the internally threaded sockets arranged for reception of a tubular externally threaded boss, each tubular externally threaded boss received within one of said internally threaded sockets includes an inverted hollow conical anchor pin, the hollow conical anchor pin defining an anchor pin cavity therewithin, and a plurality of spherical shot selectively positioned within the anchor pin cavity.

* * * * *